(12) United States Patent
Tan et al.

(10) Patent No.: US 9,307,375 B2
(45) Date of Patent: Apr. 5, 2016

(54) METHODS FOR CONNECTING DEVICES AND DEVICES USING THE SAME

(71) Applicant: MediaTek Singapore Pte. Ltd., Singapore (SG)

(72) Inventors: De-Zhang Tan, Shenzhen (CN); Yi Li, Jiyuan (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 91 days.

(21) Appl. No.: 14/039,136

(22) Filed: Sep. 27, 2013

(65) Prior Publication Data

US 2014/0092781 A1    Apr. 3, 2014

(30) Foreign Application Priority Data

Sep. 28, 2012 (CN) .......................... 2012 1 0370652

(51) Int. Cl.
| | |
|---|---|
| *H04L 12/16* | (2006.01) |
| *H04W 4/16* | (2009.01) |
| *H04W 76/02* | (2009.01) |

(52) U.S. Cl.
CPC .............. *H04W 4/16* (2013.01); *H04W 76/023* (2013.01); *H04W 76/027* (2013.01)

(58) Field of Classification Search
CPC ...................................................... H04W 4/16
USPC .......................................................... 370/259
See application file for complete search history.

(56) References Cited

U.S. PATENT DOCUMENTS

| | | | |
|---|---|---|---|
| 6,490,622 B1 | 12/2002 | Nagami et al. | |
| 6,917,600 B1* | 7/2005 | Chuah et al. | 370/328 |
| 8,233,462 B2* | 7/2012 | Walton et al. | 370/338 |
| 2004/0037308 A1 | 2/2004 | Chen et al. | |
| 2005/0195975 A1* | 9/2005 | Kawakita | 380/30 |
| 2012/0052807 A1* | 3/2012 | Rathi et al. | 455/41.3 |

FOREIGN PATENT DOCUMENTS

WO    WO 2012/115625    8/2012

* cited by examiner

*Primary Examiner* — Wei Zhao
(74) *Attorney, Agent, or Firm* — McClure, Qualey & Rodack, LLP

(57) ABSTRACT

A devices connecting method for connecting wirelessly connecting a first device to a second device. A first connection message transmitted from the second device is received, and the first connection message includes a first connection identifier. A second connection message transmitted from the second device is received, and the second connection message includes a second connection identifier. It is determined whether the second connection identifier is the same as the first connection identifier, and a corresponding determination result is provided. The second connection message is processed according to the determination result to establish the wireless connection between the first device and the second device.

42 Claims, 7 Drawing Sheets

METHODS FOR CONNECTING DEVICES AND DEVICES USING THE SAME

CROSS REFERENCE TO RELATED APPLICATIONS

This application claims priority of China Patent Application No. 201210370652.5, filed on Sep. 28, 2012, the entirety of which is incorporated by reference herein.

BACKGROUND OF THE INVENTION

1. Field of the Invention

The invention relates to a communication technique, and more particularly, to a method for connecting devices, and further to associated devices.

2. Description of the Related Art

With the development of electronic information devices, smart devices, and networks, information sharing between devices is a tendency to enhance usage experience. Information sharing between a mobile terminal and a television terminal is given as an example. If the television terminal is playing TV programs, the television terminal can show information received by the mobile terminal in real time. The user can aware the information has been received by the mobile terminal without checking the mobile terminal, which enhance the usage experience.

The first step to perform information-sharing is establishing a network connection between devices. Conventionally, the conflict problem in connection-request messages, which occurs if a connection between devices is established, can not be solved effectively, affecting the connection efficiency unfavorably.

BRIEF SUMMARY OF THE INVENTION

In order to solve the above problem, it is desirable to provide a method for connecting devices, a system, and associated devices.

An exemplary embodiment of a devices connecting method for wirelessly connecting a first device and a second device is provided. The devices connecting method comprises the steps of receiving a first connection message transmitted from the second device, wherein the first connection message includes a first connection identifier; receiving a second connection message transmitted from the second device, wherein the second connection message includes a second connection identifier; determining whether the second connection identifier is the same as the first connection identifier, and generating a determination result; and processing the second connection message according to the determination result to establish the wireless connection between the first device and the second device. The first connection message and the second connection message are both connection-request messages, or the first connection message and the second connection message are both connection-response messages.

The method further comprises connecting with the second device according to the second connection message if the second connection identifier is different from the first connection identifier; and ignoring the second connection message if the second connection identifier is the same as the first connection identifier.

Another exemplary embodiment of a devices connecting method for wirelessly connecting a first device and a second device is provided. The devices connecting method comprises the steps of transmitting a first connection-request message to the first device, wherein the first connection-request message includes a first connection identifier; and transmitting a second connection-request message to the first device to establish a wireless connection, wherein the second connection-request message includes a second connection identifier, and the first connection identifier is different from the second connection identifier.

An exemplary embodiment of a first device connecting with a second device is provided. The first device comprises a message-processing module and a wireless connection module. The message-processing module comprises a receiving unit and a processing unit. The receiving unit receives a first connection message transmitted from the second device, and the first connection message includes a first connection identifier. The processing unit determines whether the first connection identifier is the same as a connection identifier included in a connection message which was previously processed by the first device. The wireless connection module connects with the second device according to the first connection message in response to a determination result of the processing unit.

An exemplary embodiment of a second device connected with a first device is provided. The second device comprises a transmission unit and a processing unit. The transmission unit transmits a first connection-request message to the first device, and the first connection-request message includes a first connection identifier. The processing unit decides whether the second device is required to connect with the first device. If the processing unit decides that it is required to connect with the first device, the processing unit indicates the transmission unit to transmit a second connection-request message to the first device to establish a wireless connection with the first device. The second connection-request message includes a second connection identifier, and the first connection identifier is different from the second connection identifier.

According to the embodiments, different connection messages can be distinguished by using different connection identifiers. Accordingly, different connection messages can be identified, such that connection messages can be transmitted/received and processed normally, enhancing connection efficiency.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
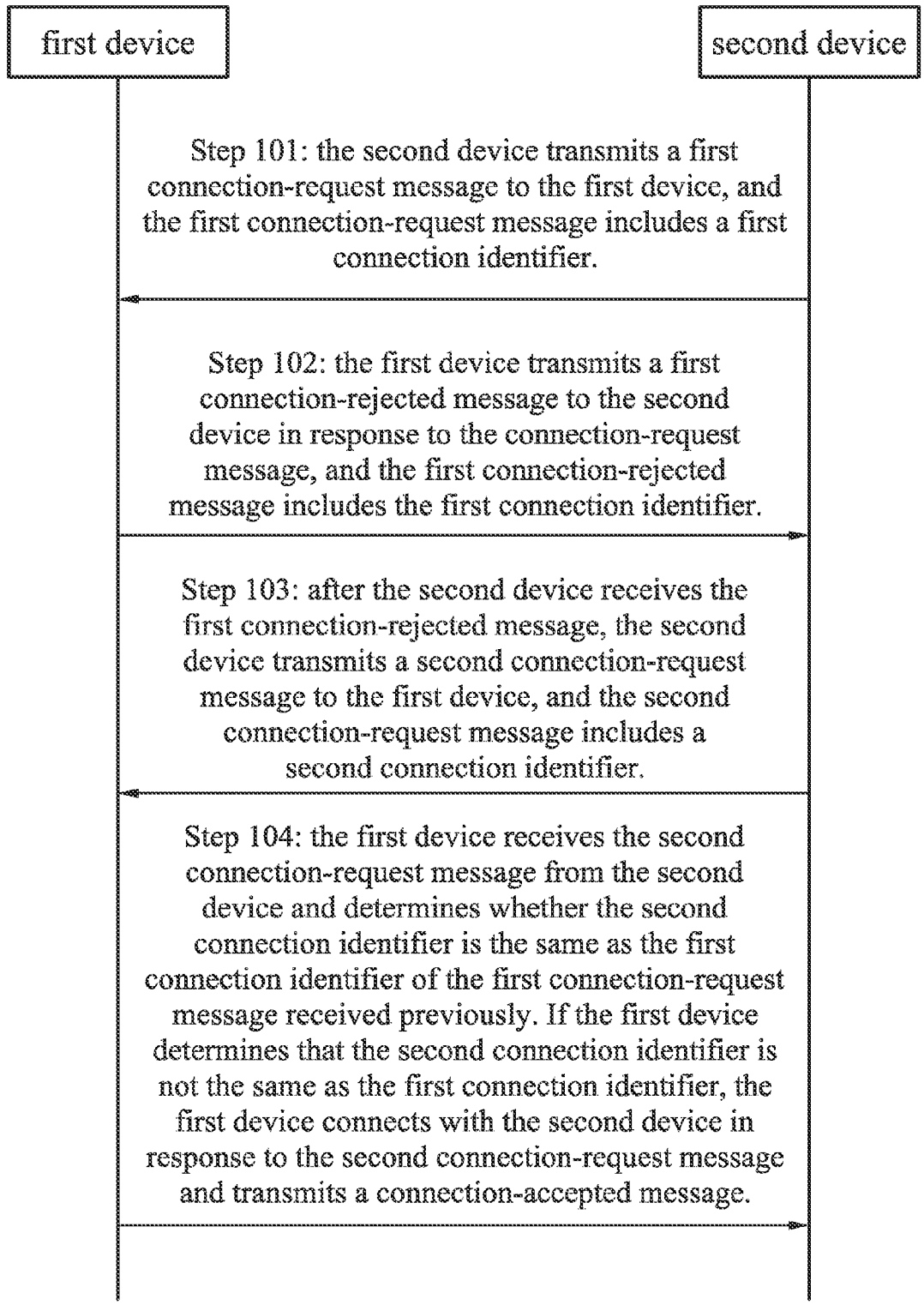
FIG. 1 is a flow chart of a system operation for a connection between devices according to the first embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

With the development of electronic information devices, smart devices, and networks, the application trend of devices is towards convenience. The invention is provided to accomplish a wireless connection between a first device and a second device to perform the synchronal display of information on the first and second devices, such that it is convenient for the user to watch the information in time. Specifically, the first device and the second device disclosed in the invention may be digital televisions, computers, smart set-top boxes, smartphones, or tablet computers. The operation systems of the first device and the second device may be Android, iSO, Windows Mobile, or Windows CE which can download and install software and services and support wired or wireless communication interfaces. For example, the first device is a digital television, while the second device is a smartphone.

If it is desirable to perform a synchronal display between the first device and the second device, it is required to establish a network connection between the first device and the second device. The network between the first device and the second device can be established through RJ45, RS232, Wifi, Bluetooth, Zigbee, infrared ray, or 3G. The first device and the second device communicate with each other by transmitting connection messages, and either the first device or the second device can transmit a connection message to the other first. For example, a connection message transmitted from the second device to the first device includes the command (CMD), the apparatus type of the second device, the medium access control (MAC) address of the second device, and a connection identifier. According to the variation of the CMD, the connection message may be a connection-request message and a connection-response message. The connection-response message further comprises a connection-rejected message and a connection-accepted message. In one embodiment, the format of the connection message transmitted from the second device to the first device may be: the CMD plus the apparatus type of the second device plus the MAC address of the second device plus the connection identifier. The apparatus type is used to indicate the type of the second device, such as a digital television, a computer, a smart set-top box, a smartphone, or a tablet. Moreover, the connection message transmitted from the second device to the first device may further include the internet protocol (IP) of the second device and the apparatus name of the second device. Thus, in yet another embodiment, the format of the connection message transmitted from the second device to the first device may be: the CMD plus the apparatus type of the second device plus the apparatus name of the second device plus the MAC address of the second device plus the IP of the second device plus the connection identifier. The apparatus name is set by the user of the second device with numbers, Chinese characters, English letters, or combination of them. Similarly, the format of the connection message transmitted from the first device to the second device may be: the CMD plus the apparatus type of the first device plus the apparatus name of the first device plus the MAC address of the first device plus the IP of the first device plus the connection identifier or CMD plus the apparatus type of the first device plus the MAC address of the first device plus the connection identifier. For the security of the information transmission between the first device and the second device, the connection identifier may be an encrypted connection identifier.

The connection messages are transmitted between the devices in a loop transmission manner, or the connection messages are transmitted between the devices for a predetermined number of times, or the transmission of the connection messages between the devices is stopped if a network connection is established between the first device and the second device. Conventionally, if connection messages are transmitted between devices in the loop transmission manner, the same connection message is received by a device A repeatedly, and this device A processes the received connection message continuously, which degrades the efficiency of the device. The invention can distinguish different connection messages by using an identifier to solve the conflict problem in the connection messages, such that the connection messages can be transmitted/received and processed in a more efficient way.

In the following, the invention will be described by referring to figures and the following embodiments.

FIG. 1 is a flow chart of a system operation for a connection between devices according to the first embodiment of the invention. The system comprises a first device and a second device. The system operates as per the following:

Step 101: the second device transmits a first connection-request message to the first device, and the first connection-request message includes a first connection identifier.

Step 102: the first device transmits a first connection-rejected message to the second device in response to the first connection-request message, and the first connection-rejected message includes the first connection identifier.

Step 103: after the second device receives the first connection-rejected message, the second device transmits a second connection-request message to the first device, and the second connection-request message includes a second connection identifier which is different from the first connection identifier.

Step 104: the first device receives the second connection-request message from the second device and determines whether the second connection identifier is the same as the first connection identifier of the first connection-request message received previously. If the first device determines that the second connection identifier is not the same as the first connection identifier, the first device connects with the second device in response to the second connection-request message and transmits a connection-accepted message.

In the embodiment, the devices connected into the network are not limited into the first device and the second device, i.e. there may be more than two devices could be able to connect with other device through the network. Moreover, the formation and transmission of the connection-request messages, the connection-rejected message, and the connection-accepted message conform to the formation and transmission manner of the messages transmitted between the above two devices. Further, in the invention, the connection-rejected message and the connection-accepted message are referred to as a "connection-response message" which represents the response to the connection-request message. According to Step 101 and Step 102 in the embodiment, the first connection-request message and the first connection-rejected message which was transmitted in response to the first connection-request message include the same connection identifier, that is the first connection identifier. If the second device receives the first connection-rejected message, the second device understands that the first connection-rejected message represents the rejection made by the first device in response to the first connection-request message. The second device does not incorrectly associate the first connection-rejected message with other connection-request messages, such that connection messages between the devices can be processed normally.

Moreover, in Step 103, if the second device is located within a covering space of a local area network provided by the first device, meets requirements of a wireless connection, and receives control input from a user for requesting the connection with the first device, the second device can proceed to transmit the second connection-request message to the first device to establish a wireless connection. In the embodiment, since the connection messages are transmitted between the devices in the loop transmission manner (that is the second connection-request message and the first connection-request message are both transmitted). In order to make the first device being able to distinguish the first connection-request message and the second connection-request message, the second device sets the second connection identifier of the second connection-request message to be different from the first connection identifier of the first connection-request message. For example, the connection identifiers are set by gradual increment or decrement. The first device receives the second connection-request message, and determines whether the connection identifier of the connection-request message is the same as the connection identifier of the connection-request message received previously so as to determine whether the received connection-request message has been processed. Similarly, the first device or the second device determines whether the connection identifier of the received connection-response message is the same as the connection identifier of the connection-response message received previously so as to determine whether the received connection-response message has been processed.

Moreover, in Step 104, in one case where the second connection identifier is different from the first connection identifier, it means that the first device has not processed the second connection-request message with the second connection identifier. Accordingly, the first device then processes the second connection-request message and transmits the first connection-accepted message to the second device to establish a connection with the second device. In other case where the second connection identifier is the same as the first connection identifier, it means that the first device has processed the second connection-request message with the second connection identifier. Accordingly, the first device does not process or ignores the second connection-request message anymore to save the processing resources of the first device.

In the above mentioned embodiment, the transmission manner and contents of the connection messages are given as an example for illustration but are not used for limiting the invention.

Figure 2:
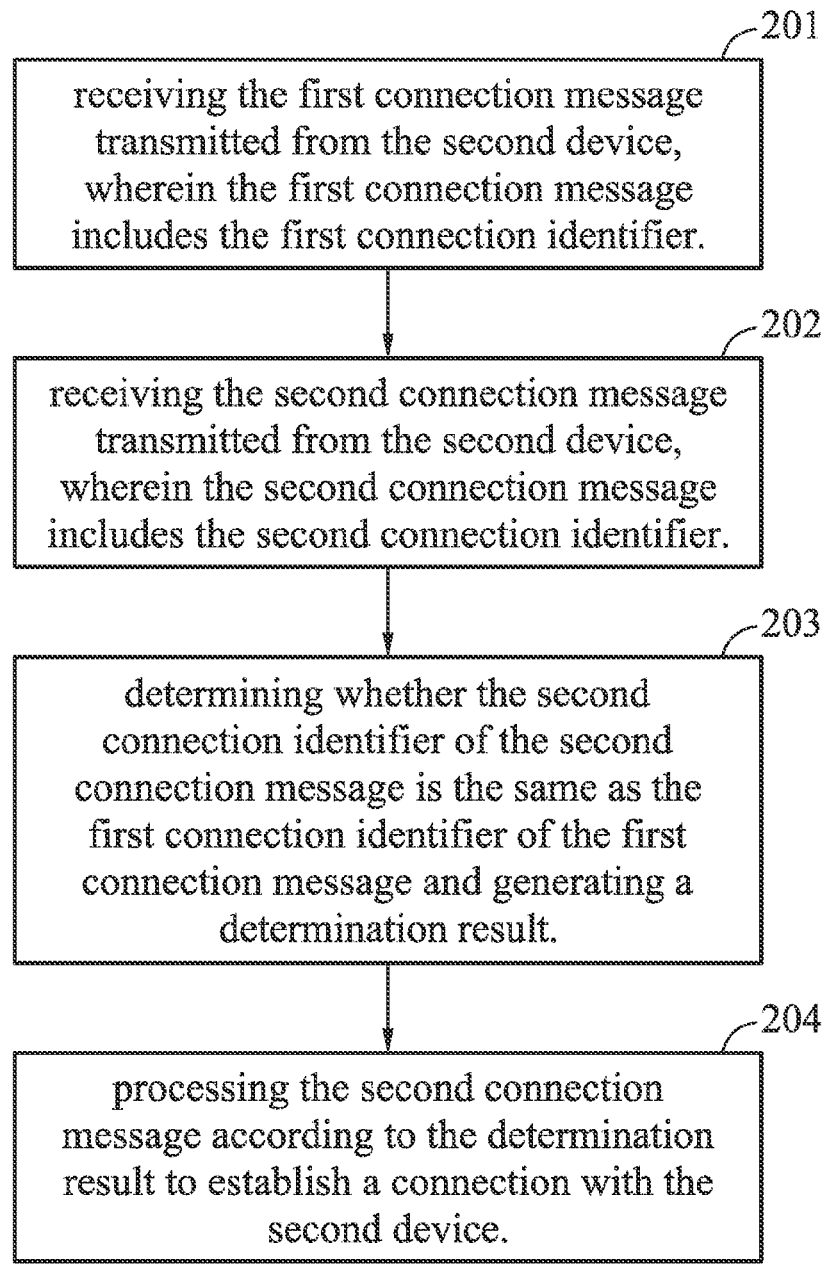
FIG. 2 is a flow chart of a method of connecting devices according to the second embodiment of the invention for establishing a wireless connection between a first device and a second device.

In the following, there are two embodiments to describe the devices connecting method of the invention in view of a transmitter and in view of a receiver. FIG. 2 is a flow chart of a method of connecting devices according to the second embodiment of the invention for establishing a wireless connection between the first device and the second device. As shown in FIG. 2, the method comprises the following steps:

Step 201: receiving the first connection message transmitted from the second device, wherein the first connection message includes the first connection identifier.

Step 202: receiving the second connection message transmitted from the second device, wherein the second connection message includes the second connection identifier.

Step 203: determining whether the second connection identifier of the second connection message is the same as the first connection identifier of the first connection message and generating a determination result.

Step 204: processing the second connection message according to the determination result to establish a connection with the second device.

The first connection message and the second connection message mentioned in above belong to the same type of connection messages, for example, they are both connection-request messages, or they are both connection-response messages. In the case where it is determined that the second connection identifier is different from the first connection identifier, it means that the second connection message transmitted from the second device has not been processed by the first device. For example, if both of the first connection message and the second connection message are connection-request messages and the first connection message transmitted from the second device has been rejected by the first device, the second connection identifier included in the second connection message retransmitted by the second device is different from the first connection identifier. At this time, the second connection message retransmitted by the second device should not be ignored. The first device may accept the second connection-request message and establish a connection with the second device according to the CMD and the MAC address of the second connection message. Alternatively, the second connection message transmitted from the second device may be rejected, and the second device could continuously transmit connection messages. If it is determined that the second connection identifier is the same as the first connection identifier, the second connection message is not processed or ignored. As described above, the first connection-rejected message and the second connection-rejected message are connection-response messages. If the second device receives the second connection-response message, the second device also has to determine whether the connection identifier included in the second connection-response message is the same as the connection identifier included in the first connection-response message to decide whether it is required to process the second connection-response message.

Figure 3:
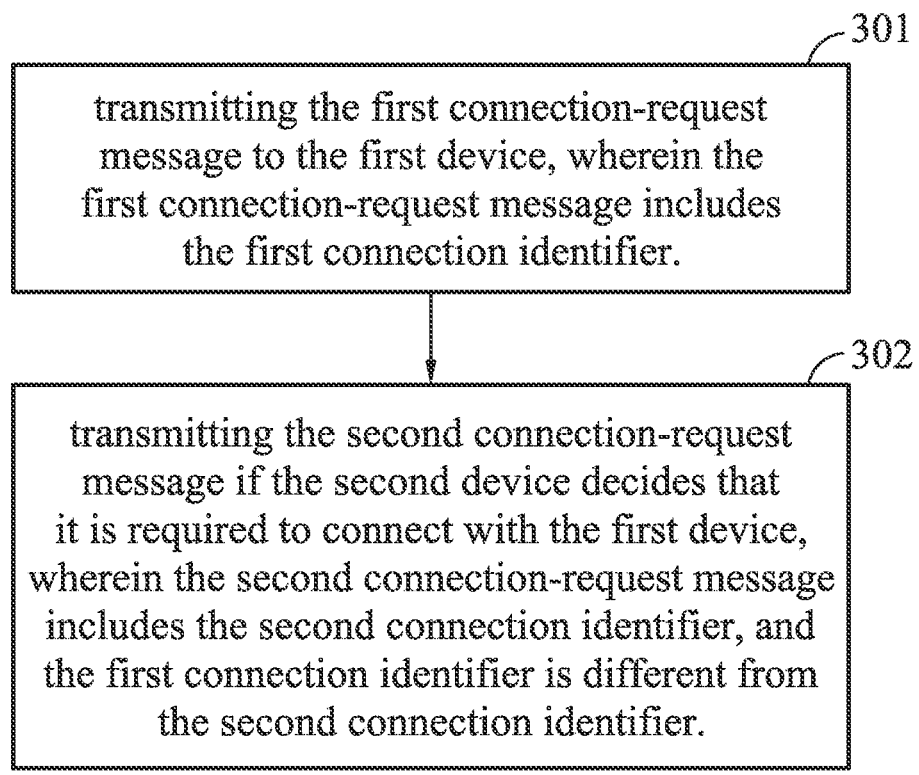
FIG. 3 is a flow chart of a devices connecting method according to the third embodiment of the invention for establishing a wireless connection between a first device and a second device.

FIG. 3 is a flow chart of a devices connecting method according to the third embodiment of the invention for establishing a wireless connection between the first device and the second device. As shown in FIG. 3, the method comprises the following steps:

Step 301: transmitting the first connection-request message to the first device, wherein the first connection-request message includes the first connection identifier.

Step 302: transmitting the second connection-request message if the second device decides that it is required to connect with the first device, wherein the second connection-request message includes the second connection identifier, and the first connection identifier is different from the second connection identifier.

In one embodiment, in order to transmit and process connection messages normally, the second connection identifier can be set in gradual increment from the first connection identifier. At this time, the case where the second connection identifier is different from the first connection identifier can be determined by determining that the second connection identifier is greater than the first connection identifier. In another embodiment, the second connection identifier can be set in gradual decrement from the first connection identifier. The case where the second connection identifier is different from the first connection identifier can be determined by determining that the second connection identifier is smaller than the first connection identifier. In Step 302, if the second device is located within the covering area of the local area network provided by the first device, meets requirements of a wireless connection, and receives a control input from the user to request and establish a connection with the first device, the second device then decides that it is required to connect with the first device and proceeds to transmit the second connection-request message to the first device to establish a wireless connection. In another embodiment, if the wireless connection between the second device and the first device is disconnected abnormally and a wireless connection between the second device and the first device was normally performed before it disconnected abnormally, the second device decides that it is required to connect with the first device and transmits the second connection-request message. The case where a wireless connection between devices is disconnected abnormally will be described in the following.

Figure 4:
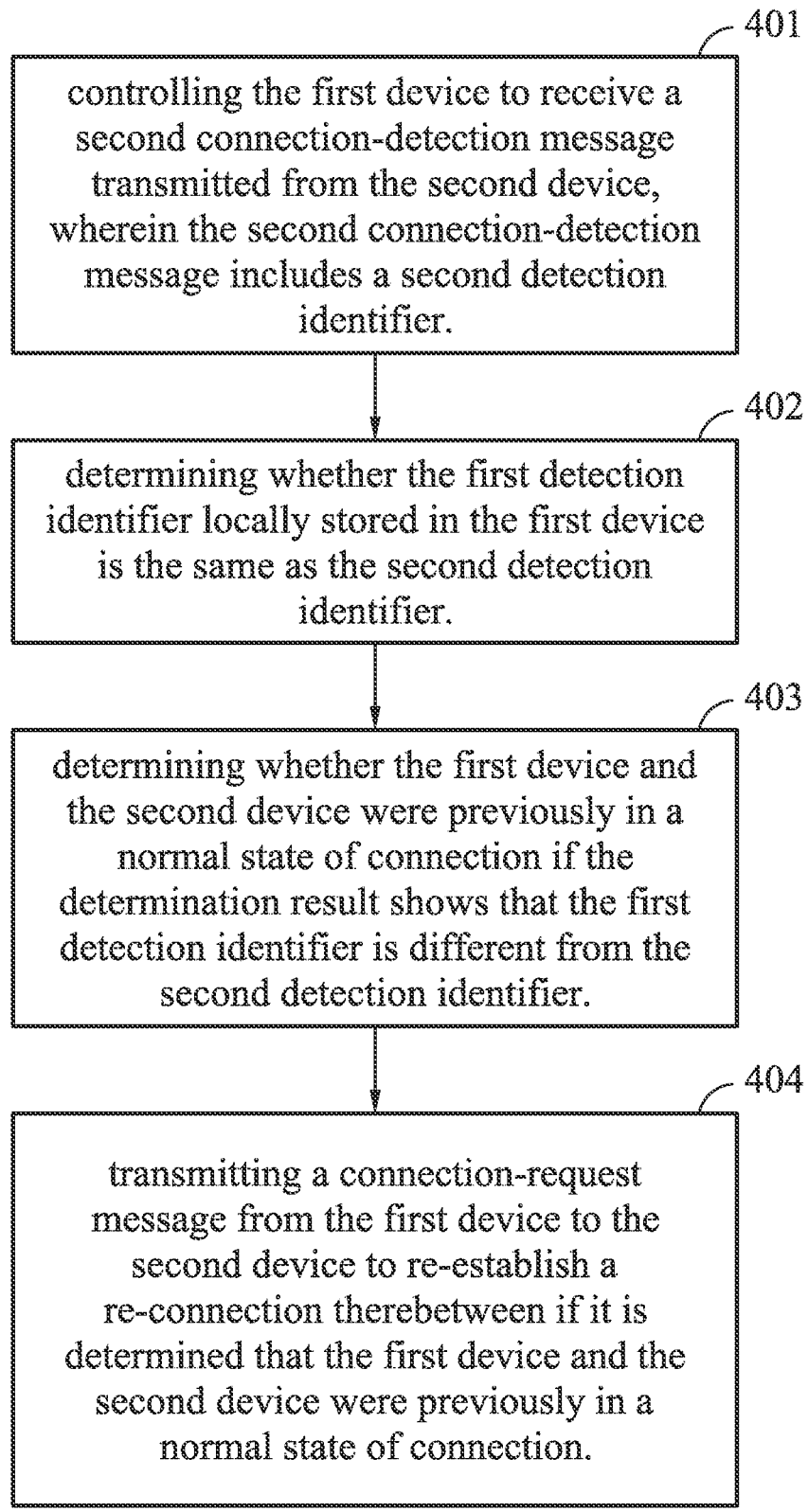
FIG. 4 is a flow chart of the automatic detection and connection process of a network between devices according to the fourth embodiment of the invention.

The first device and the second device accomplish the synchronal display of information by establishing a connection between them. Thus, after a connection between the first device and the second device has established, the connection state of the devices has to be detected in real time. The disconnection of the local area network of the first device or the second device or the loss of data packages may be caused by the device leaving the service range of the local area network (such as if a mobile phone is carried by a user who is leaving the service range of the local area network) or the device entering a sleep mode. Due to the above reasons, real-time detection and real-time updating of data and states are required for the device so as to facilitate automatically connecting devices, if the device is within the service range of the local area network. In other word, after abnormally disconnecting the network connection between the first device and the second device, a re-connection between the first device and the second device is able to be re-established automatically. FIG. 4 shows a flow chart of an automatic detection and connection process of the network between the first device and the second device according to the fourth embodiment of the invention, which includes the following steps:

Step 401: controlling the first device to receive a second connection-detection message transmitted from the second device, wherein the second connection-detection message includes a second detection identifier.

Step 402: determining whether the first detection identifier locally stored in the first device is the same as the second detection identifier.

Step 403: determining whether the first device and the second device were previously in a normal state of connection if the determination result shows that the first detection identifier is different from the second detection identifier.

Step 404: transmitting a connection-request message from the first device to the second device to re-establish a re-connection there between, if it is determined that the first device and the second device were previously in a normal state of connection.

After the first device and the second device connect with each other, the second device periodically transmits a connection-detection message to the first device. In another embodiment, after the first device and the second device connect with each other, the first device periodically transmits a connection-detection message to the second device. In other words, the embodiment of FIG. 4 is an example for illustrating the invention, and is not intend to limit the scope of the invention. In the embodiment, the format of the connection message transmitted from of the connection-detection message may be: the apparatus type of the second device plus the MAC address of the second device plus the detection identifier, or the transmission formation of the connection-detection message may be: the apparatus type of the second device plus the MAC address of the second device plus the detection identifier plus the IP of the first device plus the apparatus name of the second device. In another embodiment, if the first device periodically transmits the connection-detection message to the second device, the content of the connection-detection message may include the apparatus type of the first device, the MAC address of the first device, the apparatus name of the first device, the detection identifier, and the IP of the first device, and the related description is omitted here.

If the first device and the second device are in a normal connection state, the first device will locally store a detection identifier, for example, referred to as the first detection identifier. The first detection identifier is obtained from a first connection-detection message which was received previously by the first device if the first device and the second device connected normally. In the case where the detection identifier included in the connection-detection message received by the first device is the same as the detection identifier locally stored in the first device, it means that the network connection between the first device and the second device, which corresponds to the first detection identifier, is normal and has not disconnected. At this time, the first device continuously receives the first connection-detection message. In case where the detection identifier included in the connection-detection message received by the first device is different from the detection identifier locally stored in the first device, it means that the network connection between the first device and the second device, which corresponds to the first detection identifier, had ever been disconnected, and the network re-connection is required to be re-established.

For example, if the second device enters the local area network again after the second device disconnects from the network connection, the first device receives the second connection-detection message transmitted from the second device. The second connection-detection message includes the second detection identifier, and the second detection identifier is different from the first detection identifier. For the security of the information transmission between the first device and the second device, the detection identifiers are encrypted connection identifiers.

In case where the first device determines that the first detection identifier is different from the second detection identifier, it means that the first device and the second device has already in an abnormal connection state already, and the first device continuously determines whether the first device and the second device were previously in the normal connection state. For example, the first device checks the process records to determine whether the first device and the second device were in the normal connection state if the connection detection method of the embodiment was last performed, and further checks whether the first device and the second device were previously in the normal connection state when the connection detection method of the embodiment was last performed.

If the first device determines that the first detection identifier is different from the second detection identifier, and the first device and the second device were in a the normal connection state before the second detection identifier is received, the first device transmits a request to the second device to automatically re-establish the re-connection. Specifically, the first device automatically transmits a connection-request message to the second device. The content, transmission manner, and processing manner of the connection-request message are the same as described in the above mentioned embodiments, and are omitted here for brevity. For example, the connection-request message includes a connection identifier. The second device transmits a connection-response message in response to the connection-request message, and the connection identifier included in the connection-response message is the same as the connection identifier included in the connection-request message. For example, the connection-response message is a connection-accepted message. The first device receives the connection-accepted message which is transmitted from the second device in response to the connection-request message. In an example, if the connection between the second device and the first device is re-establish, the connection identifier included in the connection-request message is initialized to be "0". Moreover, after the first device and the second device accomplish the establishment of the connection, the first detection identifier stored in the first device is replaced with the second detection identifier.

Note that the connection detection method described above can be performed by the first device and also by the second device. One skilled in the art can understand the embodiments with obvious modifications and replacement based on the above embodiments.

Figure 5:
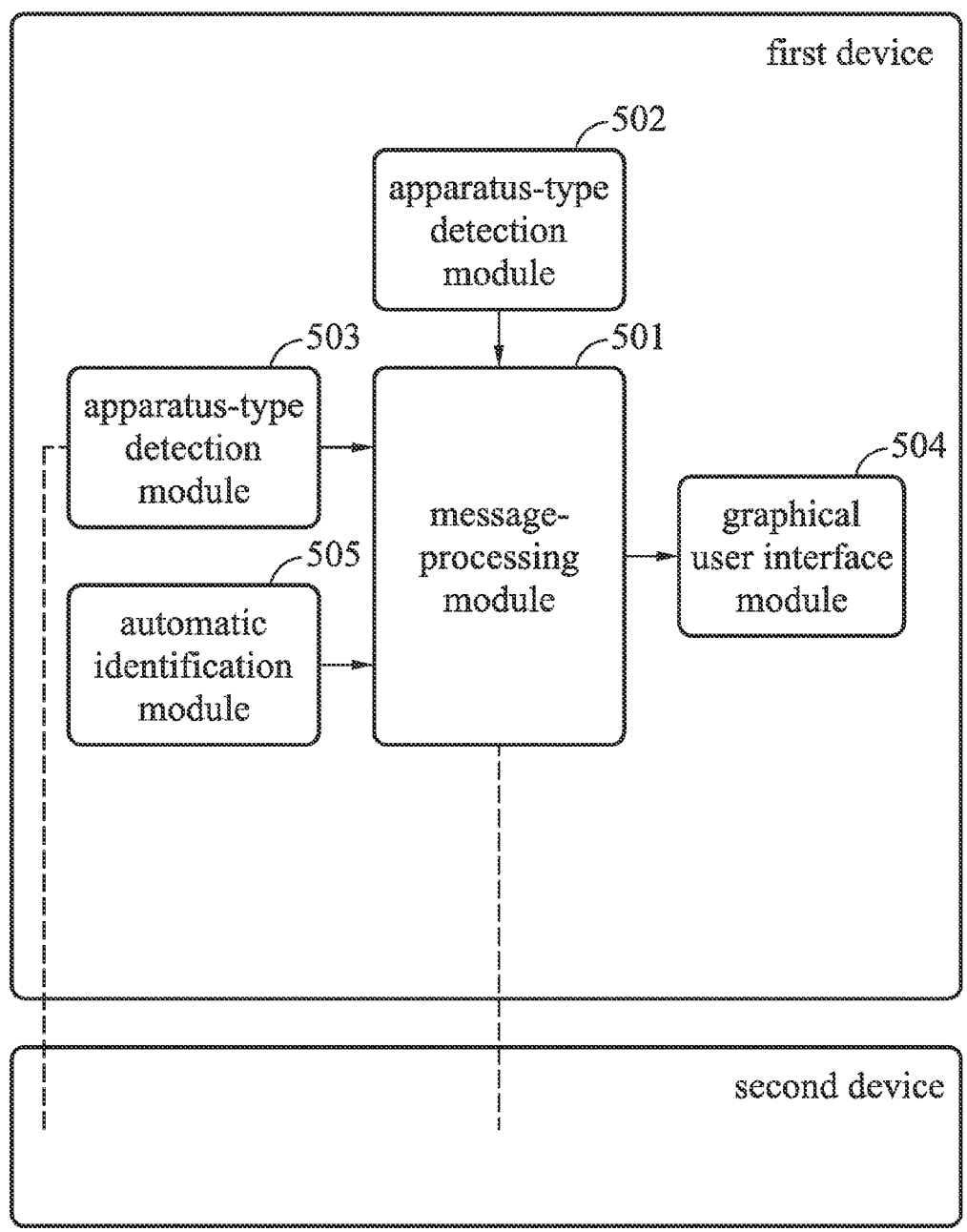
FIG. 5 is a schematic diagram of a connection device according to the fifth embodiment of the invention, wherein the connection device is specifically a first device connecting to a second device.

FIG. 5 is a schematic diagram of a connection device according to the fifth embodiment of the invention. Specifically, the connection device is the first device connecting to the second device. As shown in FIG. 5, the first device comprises a message-processing module 501, an apparatus-type detection module 502, a wireless connection module 503, a graphical user interface module 504, and an automatic identification module 505.

The message-processing module 501 is used to process messages of various types, control the connection with the second device, update the corresponding data and states, and update the graphical user interface. For example, the message-processing module 501 processes the data received from the apparatus-type detection module 502, the wireless connection module 503, the graphical user interface module 504, and the automatic identification module 505. Further, the message-processing module 501 transmits the processed data to the graphical user interface module 504 for displaying on a screen (not shown in FIG. 5) of the first device. The apparatus-type detection module 502 is used to detect the apparatus type so as to mask information transmitted from other device having the same apparatus type as the first device. The apparatus type of the device can be input by the user when the user uses the devices connecting method of the invention for the first time. For example, the user can select the apparatus type through the graphical user interface module 504. The apparatus type is stored in a non-volatile memory (not shown in FIG. 5). If the method for connecting devices disclosed in the invention is performed again, the apparatus-type detection module 502 may read the information of the apparatus type from the non-volatile memory and transmit it to a processor (not shown in FIG. 5) for processing so as to identify the apparatus type, therefore, the user does not need to input the apparatus type again. Moreover, the user may reset the information of the apparatus type. Accordingly, the apparatus-type detection module 502 has a real-time apparatus-type detection function. Moreover, since the image resolution and screen sizes of the first device may be different from these of the second device, the same interface may not be appropriate for both the first device and the second device, if the visual experience of the user is taken into consideration. Thus, it is required to detect the type of the device. Specifically, each time if the devices connecting method of the invention is enabled, the apparatus-type detection module 502 can monitor the apparatus type of the first device in real time. If the apparatus type included in the received message is the same as the apparatus type stored in the non-volatile memory of the first device, it is determined that the received message is transmitted from a device of the same type, and the information transmitted from the device may be masked, not processed or ignored.

The wireless connection module 503 is used to automatically detect a wireless network in the area where the first device is located. Further, the wireless connection module 503 is controlled by the message-processing module to accomplish a wireless connection with the second device. The graphical user interface module 504 provides interfaces to be seen and operated by the user. If the first device is a digital television and the second device is a smartphone, the graphical user interface module 504 can display the contents in two aspects. The content of one of the two aspects is caller ID. The caller information of the smartphone can be displayed on the digital television connected to the smartphone, and, in the meantime, the normal operating of the digital television will not be affected. The content of the other of the two aspects is text message information. The sender and the content of the text message received by the smartphone can be displayed on the digital television connected to the smartphone. The automatic identification module 505 is used to identify the existence of other devices. The graphical user interface module 504 can present the information sharing between the devices in a direct, user-friendly, and convenient way. For example, the user can clearly know the real-time connection state of the network, such as which wireless router the first device connects with and how the first device connects with other wireless routers. The user can set the name of the first device and set whether the first device is powered on to operate automatically. Moreover, the user can see some important information through the graphical user interface module 504, such as other devices in the same local area network detected by the first device and the state of the connections between other devices and the first device.

The automatic identification module 505 continuously broadcasts the related information of the first device to the local area network where the first device is located through a user datagram protocol (UDP) connection in a fixed time interval to announce its existence. Other devices in the local area network also announce their existence in the same manner. The first device receives information from other devices to identify the existence of the other devices. The information required for the announcement of the existence itself (taking a digital television and a smartphone as an example) includes an apparatus type, an IP address, a MAC address, an apparatus name, and a detection identifier. The apparatus type is used to inform other devices that the device itself is a smartphone or a digital television. The IP address is used to establish a transmission control protocol (TCP) connection through which the smartphone may transmit the related information of caller and messages to the digital television. Each device has a unique MAC address for distinguishing the device from others devices. The apparatus name is used to distinguish the device from other devices on the interface. The detection identifier is used to detect the situation that the UDP connection and TCP connection are disconnected unexpectedly. After other devices receive the above information from one device, they can identify the device, and they can further accomplish a connection between devices by using the above information.

Figure 6:
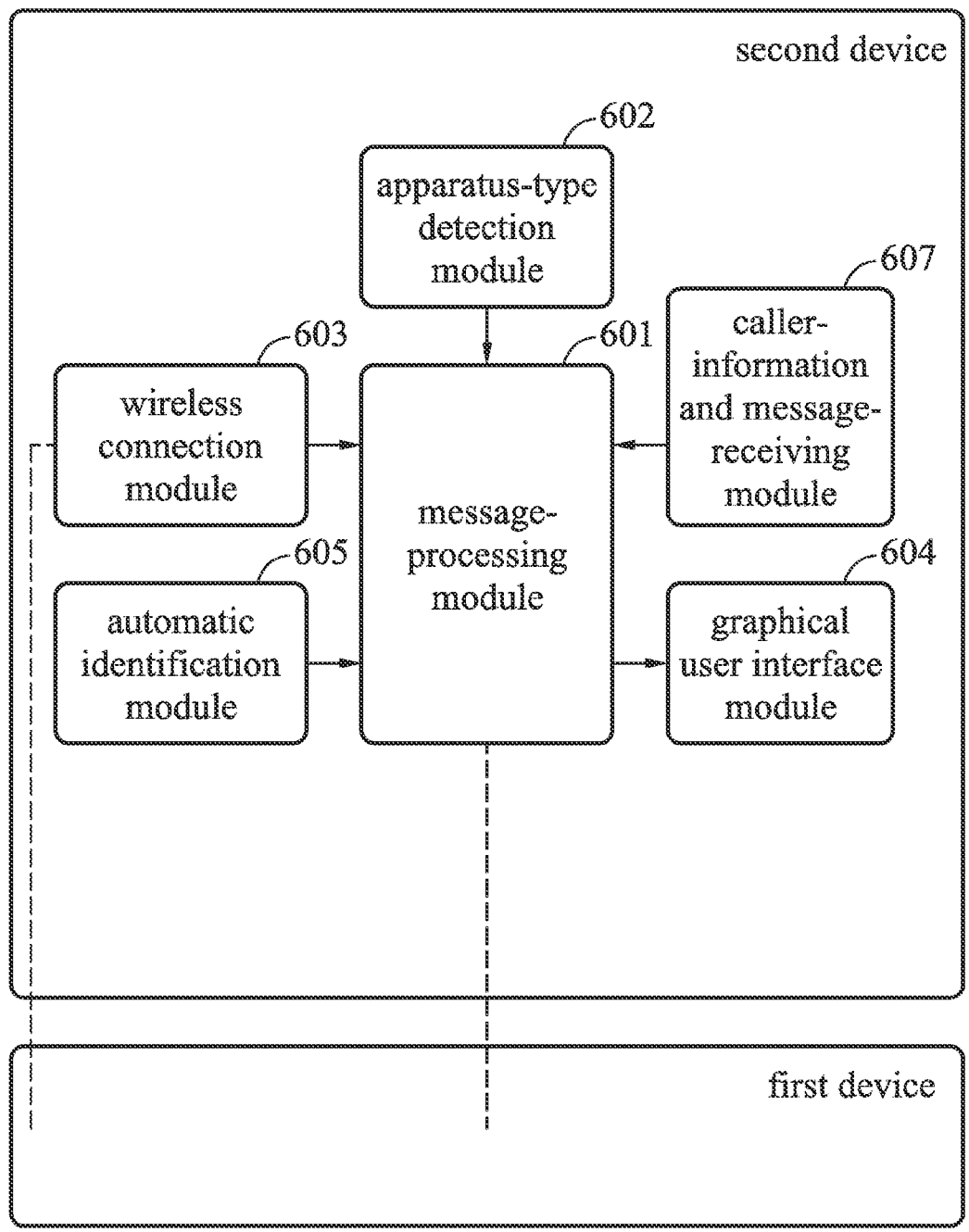
FIG. 6 is a schematic diagram of a connection device according to the sixth embodiment of the invention, wherein the connection device is specifically a second device connecting to a first device.

FIG. 6 is a schematic diagram of a connection device according to the sixth embodiment of the invention. Specifically, the connection device is the second device connecting to the first device. As shown in FIG. 6, the second device comprises a message-processing module 601, an apparatus-type detection module 602, a wireless connection module 603, a graphical user interface module 604, an automatic identification module 605, and a caller-information and message-receiving module 607.

The message-processing module 601 is used to process messages of various types, control the connection with the first device, update the corresponding data and states, and update the graphical user interface. The apparatus-type detection module 602 is used to detect the apparatus type of the second device to mask information transmitted from the device having the same apparatus type as the second device. The wireless connection module 603 is used to automatically detect a wireless network in the area where the second device is located. Further, the wireless connection module 603 is controlled by the message-processing module 601 to accomplish a wireless connection with the first device. The graphical user interface module 604 provides operation interfaces to the user. The automatic identification module 605 is used to identify the existence of other devices. The caller-information and message-receiving module 607 is used to receive the caller information and message information from the communication network.

According to the operation of the modules of FIG. 6, the message-processing module 601 processes the data transmitted from the apparatus-type detection module 602, the wireless connection module 603, the graphical user interface module 604, the automatic identification module 605, and the caller-information and message-receiving module 607 and then transmits the processed data to the graphical user interface module 604 for displaying.

First, the second device automatically detects the wireless network in the area in which the second device is located through the wireless connection module 603 and connects with the wireless network. Then, the second device identifies a device which the second device can connect to through the automatic identification module 605. After the devices which the second device is able to connect are identified, the second device transmits the connection-request message and processes the message received from the first device through the message-processing module 601 so as to perform the operation related to the connection with the first device. Once the connection between the devices is established through the wireless connection module 603, sharing the caller information and/or text message information received by the second device with the other devices can be accomplished through the caller-information and message-receiving module 607. The above function is operated in the graphical user interface module 604.

In an embodiment, the functions and operation manners of the apparatus-type detection module 602, the wireless connection module 603, the graphical user interface module 604, and the automatic identification module 605 in FIG. 6 are the similar as those of the apparatus-type detection module 502, the wireless connection module 503, the graphical user interface module 504, and the automatic identification module 505 in FIG. 5. And, thus their description is not repeated here. FIG. 6 is an example for illustrating the invention, and is not intended to limit the scope of the invention. Moreover, a digital television serving as the first device and a mobile phone serving as the second device should be treated as examples for illustration, and is not intended to limit the scope of the invention. Alternatively, in another embodiment, the first device transmits the connection-request message, while the second device transmits the connection-response message.

Figure 7:
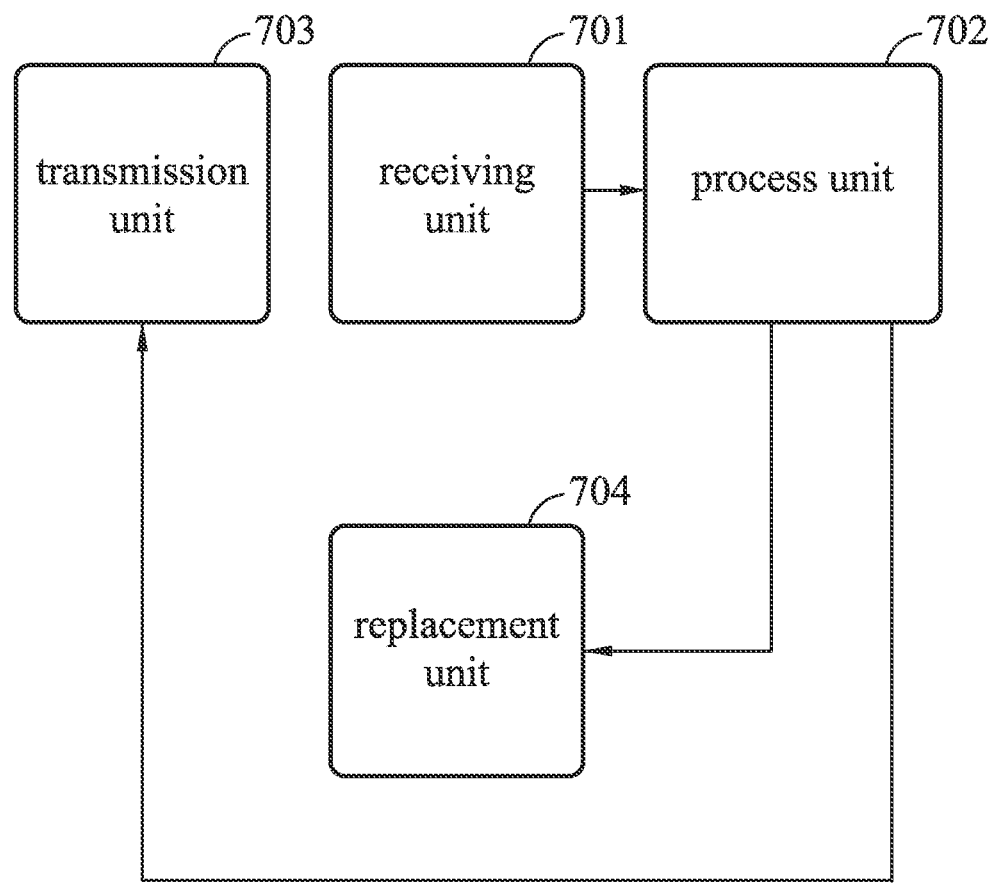
FIG. 7 shows partial units and structure of the message-processing module of a connection device according to the seventh embodiment of the invention.

FIG. 7 shows partial units and structure of the message-processing module (such as the message-processing modules shown in FIG. 5 and FIG. 6) of the device according to the seventh embodiment of the invention. The message-processing module includes a receiving unit 701, a processing unit 702, a transmission unit 703, and a replacement unit 704. In the following, the message-processing module belonging to the first device is taken as an example for illustration; however, the example does not intend to limit the invention.

The receiving unit 701 receives the connection message (such as connection-request message or the connection-response message) and the connection-detection message from the other device. The receiving unit 701 further receives the information to be displayed from the second device. Since the information to be displayed is not transmitted repeatedly, the first device receives the information to be displayed from the second device through TCP. The processing unit 702 is used to process the connection message and the information to be displayed received by the receiving unit 701 and controls the transmission operation of the transmission unit 703 and the replacement operation of the replacement unit 704. The transmission unit 703 is used to transmit the connection message (such as the connection-request message or the connection-response message) to the second device. The replacement unit 704 is used to replace the detection identifier locally stored in the first device with the current detection identifier after the wireless connection module 503 connects with the second device.

Note that in the above mentioned example, the receiving unit 701 and the transmission unit 703 of the message-processing module belong to the first device, and the first device is a television. However, the example does not intend to limit the invention. In another embodiment, if the message-processing module belongs to the second device and the second device is a portable electronic apparatus (such as a mobile phone), the receiving unit 701 receives the connection message, however it cannot receive the information to be displayed, and the transmission unit 703 transmits not only messages but also the information to be displayed. A simple description is provided here without specific illustration.

In an embodiment, the processing unit 702 decides whether it is required to establish a wireless connection with the second device. For example, if there is currently no wireless connection with the second device and the processing unit 702 receives a user control input to request connection with the second device, the processing unit 702 decides that it is required to connect with the second device and controls the transmission unit 703 to transmit a connection-request message to establish a wireless connection with the second device. In another example, if the wireless connection between the first device and the second device has disconnected abnormally, and the first device and the second device were previously in the normal connection state, the processing unit 702 decides that it is required to establish a wireless connection with the second device. Moreover, the processing unit 702 is used to process a determination operation. For example, the processing unit 702 determines whether the connection identifier included in the received connection-request message is different from the connection identifier included in the connection-request message received previously, whether the detection identifier stored locally (such as the first detection identifier) is the same as the detection identifier received currently (such as the second detection identifier), and whether the first device and the second device were previously in the normal connection state of connection if it is determined that the detection identifier stored locally (such as the first detection identifier) is different from the detection identifier received currently (such as the second detection identifier).

In an embodiment, the receiving unit 701 receives a connection-detection message (such as the second connection message). If the processing unit 702 determines that the detection identifier (such as first detection identifier) locally stored in the first device is different from the detection identifier (such as the second detection identifier) received currently, and determines that the first device and the second device were previously in the normal connection state of connection, then the processing unit 702 decides that it is required to connect with the second device. The receiving unit 701 receives the connection-accepted message which is transmitted from the second device in response to the connection-request message. The processing unit 702 controls the wireless connection module 503 to connect with the second device according to the connection-accepted message. After the wireless connection module 503 connects with the second device according to the connection-accepted message, the replacement unit 704 replaces the first detection identifier stored in the first device with the second detection identifier. Moreover, if the processing unit 702 determines that the detection identifier locally stored in the first device (such as first detection identifier) is the same as the detection identifier received currently (such as the second detection identifier), it is determined that the first device and the second device are in the normal connection state, and the receiving unit 701 continuously receives the connection-detection messages.

In another embodiment, the receiving unit 701 receives a connection-request message transmitted from the second device (such as the second connection-request message). If the processing unit 702 determines that the connection identifier (such as the first connection identifier) included in the received connection-request message (such as the second connection-request message) is different from the connection identifier (such as the first connection identifier) included in the connection-request message received previously (such as the first connection-request message), the transmission unit 703 transmits a connection-response message in response to the connection-request message, wherein the connection-response message includes a connection identifier. If the processing unit 702 determines that the connection identifier (such as the first connection identifier) included in the received connection-request message (such as the second connection-request message) is the same as the connection identifier (such as the first connection identifier) included in the connection-request message received previously (such as the first connection-request message), the first device does not process the connection-request message received currently (such as the second connection-request message).

In another embodiment, the connection message received by the receiving unit 701 is a connection-response message. The processing unit 702 determines whether the connection identifier included in the connection-response message received currently is the same as the connection identifier included in the connection-response message processed previously, wherein the connection-response message received currently and the connection-response message processed previously are the same type. In case where the determination result represents that they are the same, it means that the first device has processed the connection-response message received currently. In case where the determination result represents that they are different, it means that the first device has not processed the connection-response message received currently and has to process it. The wireless connection module 503 connects with the second device in response to the received connection-response message according to the determination result of the processing unit 702. Specifically, the connection request connection includes the CMD, the apparatus type of the second device, the MAC address of the second device, and the connection identifier. If the processing unit 702 determines that the connection-request message received currently has not been processed, the wireless connection module 503 connects the first device to the second device according to the CMD and the MAC address included in the connection-request message received currently.

The modules and units shown in FIG. 7 can perform the steps of FIG. 1 and FIG. 2. The specific operation flow and detailed operation are omitted here.

FIG. 5, FIG. 6, and FIG. 7 show an example of modules performing device functions. First, the first device detects the wireless network in the area where the first device is located through the wireless connection module 503 and connects with the wireless network. Then, other devices, with which the first device requires to connect, in the wireless network are identified through the graphical user interface module 504 and the automatic identification module 505. After the devices which the first device requires to connect are identified, the message-processing module 501 processes messages of various types, such as connection-request messages, connection-response messages, connection-detection message, and information to be displayed from the second device, and further updates the display of the graphical user interface and various internal references and states (such as the detection identifier stored locally). The wireless connection module 503 establishes the connection according to the process result of the message-processing module 501.

In an embodiment, the second device transmits a connection message to the first device. First, before the first device receives the connection message, the apparatus-type detection module 502 requires detecting the type of the second device to mask the information transmitted from the device of the same type as the first device. After receiving the connection message, the processing unit 702 of the first device determines whether the connection identifier included in the received connection message is the same as the connection identifier included in the connection message of the same type received previously. In case where the determination result represents that they are different, it means that the connection message has not been processed. The wireless connection module 503 connects with the second device according to the received connection message. After the first device connects with the second device, the receiving unit 701 receives information to be displayed from the second device, the received caller information and message information is displayed through the graphical user interface module 504.

In yet another embodiment, the user operates the device according to user interface provided by the graphical user interface module 504. For example, the user interface may include connection object (referred to as Connect), disconnection object (referred to as Disconnect), agreement object (referred to as Agree), and disagreement object (referred to as Disagree). After the user selects these objects through the user interface, the transmission unit 703 transmits a corresponding connection message to the second device according to the commands of the processing unit 702. If the second device receives the connection message, the user operating the second device is required to perform corresponding operations on the connection control module of the second device to accomplish the connection between the first device and the second device. The CMD included in the above connection-request message or connection-response message corresponds to the command indicated by the user. The connection identifier included in the above connection-request message or connection-response message is used to assist the connection messages to be transmitted/received and processed normally and mark whether the connection message including the connection identifier has been processed. If the user selects "Connect", the first device transmits a "Request" command in a loop manner, wherein CMD is the "Request" command. If the user selects "Disconnect", the first device transmits "Disconnect" information in a loop manner. If the user selects "Agree", the first device transmits "Agree" information in a loop manner. If the user selects "Disagree", the first device transmits "Disagree" information in a loop manner. The first device transmits the information flow through the user's operation to accomplish the connection task. In the embodiment, the transmission of the connection messages is performed by a user datagram protocol (UDP).

In the following, the operation of the connection identifier in the device connection will be illustrated by a digital television as the first device and a smartphone as the second device. If a user A selects "Connect" on the smartphone, the smartphone transmits connection information of CMD=Request continuously. If a user B does not want to establish the connection, user B would select "Disagree". At this time, the digital television transmits information of CMD=Disagree to the smartphone. The smartphone makes a response if receiving the information from the digital television. In this case, according to the loop transmission of the information, the digital television transmits the information of CMD=Disagree to the smartphone continuously. If there is any connection identifier, if the Smartphone transmits the connection request "Request" again, the smartphone would continuously receive the information of "Disagree" from the digital television, and the connection is still not established. In this case, different connection identifiers can used to determine whether the information of "Disagree" was previously received and processed. If the information of "Disagree" was received and processed, the information is not processed anymore. Otherwise, the information is received and processed, such that the problem of the clash of the connection messages can be solved, and the messages can be effectively transmitted/received and processed normally. In an embodiment, the smartphone and the digital television operate on Android systems.

If an Android Smartphone receives calls, hangs up calls, or receives messages, the system sends messages. The smartphone receives these messages and obtains detailed information from these messages through some API elements provided by the Android system. The smartphone transmits detailed information to a digital television according to various operation commands through various information modes. The digital television receives the information from the smartphone, divides the information into various contents, and displays the required contents. In practical applications, several smartphones can connect with several digital televisions. Thus, the smartphones or digital televisions use lists to store information from different devices and stores or deletes the information in the lists in real time.

According to the above description, the invention is different from the convention. The invention uses identifiers to distinguish connection messages. For example, after the first device receives the second connection message from the second device, the first device determines whether the second connection identifier included in the second connection message is the same as the first connection identifier included in the first connection message received previously and generates a determination result. The first device processes the second connection message according to the determination result. If the connection-request message transmitted from one of the two devices is rejected and the device transmits the connection-request message again according to the user command, the connection identifier included in the connection-request message which is transmitted again is different from the connection identifier included in the connection-request message which was previously rejected. Any application which can control the processing of connection messages according to connection identifiers included in connection messages transmitted between devices is within the scope of the invention. According to the above embodiments, the invention can identify different connection messages, such that the connection messages can be transmitted/received and processed normally, enhancing connection efficiency.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A devices connecting method for wirelessly connecting a first device and a second device, comprising:
   receiving a first connection message transmitted from the second device, wherein the first connection message includes a first connection identifier;
   receiving a second connection message transmitted from the second device, wherein the second connection message includes a second connection identifier;
   determining whether the second connection identifier is the same as the first connection identifier and generating a determination result to determine whether the second connection message has been processed by the first device; and
   processing the second connection message according to the determination result;
   wherein the first connection message and the second connection message are both connection-request messages, or the first connection message and the second connection message are both connection-response messages.

2. The method as claimed in claim 1, further comprising:
   connecting with the second device according to the second connection message if the second connection identifier is different from the first connection identifier; and
   ignoring the second connection message if the second connection identifier is the same as the first connection identifier.

3. The method as claimed in claim 2, wherein if the first connection message is a first connection-request message, the second connection message is a second connection-request message, and the method further comprises:
   transmitting a first connection-rejected message from the first device in response to the first connection-request message, wherein the first connection-rejected message includes the first connection identifier; and transmitting a second connection-accepted message from the first device if the first device determines that the second connection identifier is different from the first connection identifier.

4. The method as claimed in claim 1, further comprising: re-establishing a re-connection between the first device and the second device if a network connection between the first device and the second device is disconnected abnormally.

5. The method as claimed in claim 4, wherein the step of re-establishing the re-connection between the first device and the second device comprises:
controlling the first device to receive a second connection-detection message transmitted from the second device, wherein the second connection-detection message includes a second detection identifier;
determining whether a first detection identifier locally stored in the first device is the same as the second detection identifier;
determining whether the first device and the second device were previously in a normal connection state if the first detection identifier is different from the second detection identifier; and
transmitting a third connection-request message from the first device to the second device to re-establish the re-connection between the first device and the second device if the first device and the second were previously in the normal connection state.

6. The method as claimed in claim 5, further comprising:
receiving a first connection-accepted message transmitted from the second device in response to the third connection-request message transmitted by the first device; and
connecting with the second device according to the first connection-accepted message.

7. The method as claimed in claim 5, further comprising:
controlling the first device to receive a first connection-detection message from the second device if the first device and the second device are in the normal connection state, wherein the first connection-detection message includes the first detection identifier, and the first device stores the first detection identifier.

8. The method as claimed in claim 7, wherein the first connection-detection message comprises an apparatus type of the second device, a medium access control address of the second device, an internet protocol of the second device, an apparatus name of the second device, and the first detection identifier; and wherein the second connection-detection message comprises the apparatus type of the second device, the medium access control address of the second device, the internet protocol of the second device, the apparatus name of the second device, and the second detection identifier.

9. The method as claimed in claim 5, further comprising:
replacing the first detection identifier stored in the first device with the second detection identifier after the re-connection between the first device and the second device is re-established.

10. The method as claimed in claim 5, further comprising:
determining whether the first device and the second device are in the normal connection state if the first detection identifier is the same as the second detection identifier.

11. The method as claimed in claim 1, wherein the first connection message comprises a command, an apparatus type of the second device, a medium access control address of the second device, and the first connection identifier; and wherein the second connection message comprises the command, the apparatus type of the second device, the medium access control address of the second device, and second connection identifier.

12. The method as claimed in claim 11, wherein the first connection message further comprises an internet protocol of the second device and an apparatus name of the second device; and wherein the second connection message further comprises the internet protocol of the second device and the apparatus name of the second device.

13. The method as claimed in claim 1, wherein the first connection message and the second connection message are transmitted by a loop transmission manner, or the first connection message and the second connection message are transmitted for a predetermined number of times, or the first connection message and the second connection message is not transmitted if a network connection between the first device and the second device is established.

14. The method as claimed in claim 1, wherein the first connection identifier and the second connection identifier are encrypted.

15. The method as claimed in claim 1, further comprising:
receiving information from the second device after the first device connecting with the second device; and
controlling the first device to display the information on a screen of the first device.

16. The method as claimed in claim 1, further comprising:
transmitting information to be displayed after the first device connects with the second device.

17. The method as claimed in claim 1, wherein if the second connection identifier is increased from the first connection identifier, it is determined that the second connection identifier is different from the first connection identifier.

18. A devices connecting method for wirelessly connecting a first device and a second device, comprising:
transmitting a first connection-request message to the first device, wherein the first connection-request message includes a first connection identifier; and
transmitting a second connection-request message to the first device to establish a wireless connection, wherein the second connection-request message includes a second connection identifier, and the first connection identifier is different from the second connection identifier to indicate that the second connection message has not been processed by the first device.

19. The method as claimed in claim 18, wherein if the wireless connection is disconnected abnormally and the first device and the second device were previously connected with each other normally, the second device transmits the second connection-request message.

20. The method as claimed in claim 19, further comprising:
receiving a second connection-detection message transmitted from the first device, wherein the second connection-detection message includes a second detection identifier; and
determining whether the second detection identifier and a first detection identifier locally stored in the second device are the same; and
determining that the wireless connection between the first device and the second device is disconnected abnormally if the second detection identifier and the first detection identifier locally stored in the second device are different.

21. The method as claimed in claim 19, further comprising:
receiving a first connection-detection message from the first device if the first device and the second device connect with each other, wherein the first connection-detection message includes the first detection identifier, and the second device stores the first detection identifier.

22. The method as claimed in claim 18, wherein if the first connection-request message is rejected by the first device and the second device receives a user command, the second device transmits the second connection-request message.

23. A first device connecting with a second device, comprising:
a message-processing module and a wireless connection module, wherein the message-processing module comprises:
a receiving unit receiving a first connection message transmitted from the second device, wherein the first connection message includes a first connection identifier; and
a processing unit determining whether the first connection identifier is the same as a connection identifier included in a connection message which was previously processed by the first device; and
wherein the wireless connection module connecting with the second device according to the first connection message in response to a determination result of the processing unit;
wherein if the first connection identifier is different from the connection identifier included in the connection message which was previously processed by the first device, the wireless connection module connects with the second device according to the first connection message; and
wherein if the first connection identifier is the same as the connection identifier included in the connection message which was previously processed by the first device, the wireless connection module ignores the first connection message.

24. The first device as claimed in claim 23, wherein the message processing module further comprises:
a transmission unit for transmitting a first connection-response message in response to the first connection-request message if the first connection message is a first connection-request message;
wherein the first connection-response message includes the first connection identifier.

25. The first device as claimed in claim 23,
wherein the first connection message comprises a command, an apparatus type of the second device, a medium access control address of the second device, and the first connection identifier; and
wherein the wireless control module connects the first device with the second device according to the command and the medium access control address of the second device of the first connection message.

26. The first device as claimed in claim 23, wherein if a network connection between the first device and the second device is disconnected abnormally, the first device re-establishes a re-connection with the second device.

27. The first device as claimed in claim 26,
wherein the receiving unit receives a second connection-detection message transmitted from the second device, wherein the second connection-detection message includes a second detection identifier;
wherein the processing unit determines whether a first detection identifier locally stored in the first device is the same as the second detection identifier;
wherein the processing unit determines whether the first device and the second device were previously in a normal connection state if the processing unit determines that the first detection identifier is different from the second detection identifier;

wherein the message-processing module further comprises a transmission unit which transmits a second connection-request message to the second device if the processing unit determines that the first device and the second device were previously in the normal connection state; and
wherein the receiving unit receives a first connection-accepted message which is transmitted from the second device in response to the second connection-request message, and the wireless connection module connects with the second device according to the first connection-accepted message.

28. The first device as claimed in claim 27, wherein the message-processing module further comprises a replacement unit replacing the first detection identifier stored in the first device with the second detection identifier after the re-connection between the first device and the second device is re-established.

29. The first device as claimed in claim 27, wherein if the processing unit determines that the first detection identifier is the same as the second detection identifier, the processing unit determines that the first device and the second device are in the normal connection state.

30. The first device as claimed in claim 27,
wherein the second connection-detection message comprises an apparatus type of the second device, a medium access control address of the second device, an second detection identifier, an internet protocol of the second device, and an apparatus name of the second device.

31. The first device as claimed in claim 23,
wherein after the first device connecting with the second device, the receiving unit receives information from the second device, and
wherein the first device further comprises:
a graphical user interface module displaying the information, wherein the message-processing module controls the display of the graphical user interface module.

32. The first device as claimed in claim 23, further comprising:
an apparatus-type detection module detecting an apparatus type of the first device.

33. The first device as claimed in claim 23, wherein the wireless connection module automatically detects a wireless network in an area where the first device is located and connects with the wireless network.

34. The first device as claimed in claim 23, further comprising:
a caller-information and message-receiving module receiving caller information and message information,
wherein the information is caller information or message information.

35. The first device as claimed in claim 23, wherein if a wireless connection between the first device and the second device is disconnected abnormally, the first connection identifier included in the first connection message received by the first device is initialized to be "0".

36. A second device connected with a first device, comprising:
a transmission unit transmitting a first connection-request message to the first device, wherein the first connection-request message includes a first connection identifier; and
a processing unit deciding whether the second device is required to connect with the first device;
wherein if the processing unit decides that the second device is required to connect with the first device, the processing unit indicates the transmission unit to transmit a second connection-request message to the first device to establish a wireless connection with the first device; and wherein the second connection-request message includes a second connection identifier, and the first connection identifier is different from the second connection identifier to indicate that the second connection message has not been processed by the first device.

37. The second device as claimed in claim 36, wherein if the wireless connection between the first device and the second device is disconnected abnormally, the process unit decides that it is required to connect with the first device.

38. The second device as claimed in claim 37, further comprising:
a receiving unit receiving a second connection-detection message transmitted from the first device, wherein the second connection-detection message includes a second detection identifier,
wherein the processing unit determines whether the second detection identifier and a first detection identifier locally stored in the second device are the same;
wherein if the second detection identifier and the first detection identifier locally stored in the second device are different, the processing unit determines whether the first device and the second device were previously in a normal connection state, and
wherein if the processing unit determines that the first device and the second device were previously in the normal connection state of connection, the processing unit determines that the wireless connection between the first device and the second device is disconnected abnormally.

39. The second device as claimed in claim 37,
wherein if the first device and the second device are in a normal connection state, the receiving unit receives a first connection-detection message transmitted from the first device; and
wherein the first connection-detection message includes a first detection identifier, and the second device stores the first detection identifier.

40. The second device as claimed in claim 37, wherein if the wireless connection between the first device and the second device is disconnected abnormally, the second connection identifier included in the second connection-request message transmitted from the transmission unit to the first device is initialized to be "0".

41. The second device as claimed in claim 36, wherein the first connection-request message and the second connection-request message are transmitted by a loop transmission manner, or the first connection message and the second connection-request message are transmitted for a predetermined number of times, or transmission of the first connection message and the second connection-request message is not transmitted if a connection is established between the first device and the second device.

42. The second device as claimed in claim 36, wherein if the first connection-request message is rejected by the first device and the second device receives a user command, the processing unit decides that it is required to connect with the first device.

* * * * *